United States Patent [19]
Kotelnikov et al.

[11] 3,919,116
[45] Nov. 11, 1975

[54] PHOSPHATIC CATALYST FOR THE DEHYDROGENATION OF OLEFINS AND ALKYLATED AROMATIC HYDROCARBONS AND METHOD OF PREPARING SAME

[76] Inventors: Georgy Romanovich Kotelnikov, Gorodskoi val, 16, kv. 74; Stanislav Fedorovich Bednov, ulitsa Em. Yaroslavskogo, 114, kv. 2; Boris Vasilievich Sirotkin, 1 Zhilaya ulitsa, 6, kv. 23; Alexandr Nikitich Bushin, ulitsa Pervomaiskaya, 9, kv. 21, all of Yaroslavl; Roman Alexeevich Buyanov, ulitsa Zhemchuzhnaya 8, kv. 20, Novosibirsk; Ljudmila Viktorovna Strunnikova, 1 Leningradsky proezd, 11, kv. 75, Yaroslavl; Mikhail Mikhailovich Andrushkevich, ulitsa Tereshkovoi, 6, kv. 157, Novosibirsk; Nikolai Alexandrovich Karnaev, ulitsa Zasulich, 3, kv. 28, Sverdlovsk; Andrian Petrovich Troitsky, 3 Cheremushkinskaya ulitsa, 18, korpus 2, kv. 53, Moscow; Yakov Yakovlevich Kirnos, Uglichskoe shosse, 10, kv. 54, Yaroslavl; Tamara Mikhailovna Ivanitskaya, ulitsa Vainera, 3, kv. 55, Sverdlovskaya oblast, Pervouralsk; Alexandr Nikolaevich Shishkin, ulitsa Chkalova, 76, kv. 38, Yaroslavl; Vladimir Ivanovich Ponomarenko, ulitsa Yakutova, 22; Nickolai Yakovlevich Eremenko, ulitsa Odesskaya, 31, both of Sterlitomak; Vadim Alexandrovich Dultsev, ulitsa Uritskogo, 55, kv. 38, Yaroslavl; Alexandr Grigorievich Liakumovich, prospekt Lenina, 23, kv. 4, Sterlitomak; Gennady Arkadievich Stepanov, ulitsa Pervomaiskaya, 9, kv. 3, Yaroslavl; Valerian Mikhailovich Sobolev, naberezhnaya M. Gorkogo, 46/50, kv. 85, Moscow, all of U.S.S.R.

[22] Filed: May 17, 1973
[21] Appl. No.: 361,155

[52] U.S. Cl. .......... 252/437; 260/669 R; 260/680 R
[51] Int. Cl.² ..................................... B01J 27/18
[58] Field of Search .................. 252/437; 204/90

[56] References Cited
UNITED STATES PATENTS

| | | | |
|---|---|---|---|
| 2,933,543 | 4/1960 | Ambridge et al. | 252/437 X |
| 3,298,966 | 1/1967 | Bagnetto | 252/437 |
| 3,327,010 | 6/1967 | Noddings et al. | 252/437 X |
| 3,501,549 | 3/1970 | Noddings et al. | 252/437 X |
| 3,621,071 | 11/1971 | Noddings et al. | 252/437 X |

*Primary Examiner* — Patrick P. Garvin
*Attorney, Agent, or Firm* — Waters, Schwartz & Nissen

[57] ABSTRACT

A phosphatic catalyst for the dehydrogenation of olefins and alkylated aromatic hydrocarbons containing between 20 and 40 wt % of calcium, between 3 and 6 wt % of nickel, between 0.5 and 5 wt % of chromium, between 0.5 and 5 wt % of titanium or between 0.1 and 15 wt % of zirconium, and between 45 and 70 wt % of the phosphate ion.

Said catalyst is prepared from phosphates of nickel and chromium obtained by the reduction of six-valent chromium in the presence of phosphoric acid and nickel or a nickel compound; to the phosphates so obtained a calcium salt is added and the mixture is precipitated. After settling, added to the phosphates are either titanium compounds in an amount corresponding to between 0.5 and 5 wt % of the metal or zirconium compounds in an amount corresponding to between 0.1 and 15 wt % of the metal. The powder is pelletized and the pellets are subjected to heat treatment by steam at a temperature between 600° and 800°C.

12 Claims, No Drawings

PHOSPHATIC CATALYST FOR THE DEHYDROGENATION OF OLEFINS AND ALKYLATED AROMATIC HYDROCARBONS AND METHOD OF PREPARING SAME

The present invention relates to catalytic processes, and more specifically relates to phosphatic catalysts for the dehydrogenation of olefins and alkylated aromatic hydrocarbons and the methods for preparing them.

These catalysts find wide-spread application in the production of such important monomers as butadiene, isoprene, styrene and $\alpha$-methylstyrene by the catalytic dehydrogenation of appropriate unsaturated hydrocarbons.

Known in the art is a variety of catalysts serving this purpose. Among them, ranking first in terms of effectiveness are phosphatic catalysts containing phosphates of calcium and nickel and chromium compounds in a certain proportion. Also known are various modifications of the phosphatic catalyst in which strontium is substituted for calcium or added to which are such elements as vanadium, tungsten cobalt, iron, copper. All the above modifications of the phosphatic catalyst showed no significant advantages over the calcium and nickel phosphate type and failed to attain industrial recognition.

A catalyst for the dehydrogenation of olefins which is based on phosphates of calcium and nickel and on chromium oxide and which is used on a large scale all over the world is prepared by adding ammonium phosphate to a solution containing chlorides of calcium and nickel with the result that the precipitation of phosphates of calcium and nickel takes place. The process is carried out at room temperature with a pH-value of the medium between 7 and 8.3 and with an atom-calcium-to-atom-nickel ratio commonly averaging between 9:1 and 9.5:1. Water-soluble salts are washed out, the phosphates are filtered, dried and ground to a particle size of about 1 mm. On being mixed with 2 wt % of green chromium oxide and 2 wt % of graphite, the phosphate powder is pelletized.

Inherent in this catalyst is the drawback of short service life in industrial reactors and, consequently, low efficiency of the process. Low mechanical strength is the main factor affecting the service life.

To increase the strength of the catalyst, attempts were made to add diatomites to the catalyst of have recourse to other means as, for example, mechanical treatment of phosphates during their drying. The result was either high mechanical strength, as one of between 8 and 13 kg/pellet or 75 kg/cm², obtained at the cost of considerably impairing the activity of the catalyst or the retention of high activity of the catalyst, around 50 to 52%, but low mechanical strength averaging between 15 and 30 kg/cm².

The object of the present invention is to develop a new and highly-effective phosphatic catalyst for the dehydrogenation of olefins and alkylated aromatic hydrocarbons which combines good catalytic properties with high mechanical strength so that portracted service life in industrial reactors is a practical possibility.

Said object has been attained by providing a phosphatic catalyst for the dehydrogenation of olefins and alkylated aromatic hydrocarbons which includes calcium, nickel and chromium and contains, according to the invention, between 20 and 40 wt % of calcium, between 3 and 6 wt % of nickel, between 0.5 and 5 wt % of chromium, between 0.1 and 15 wt % of zirconium or between 0.5 and 5 wt % of titanium, and between 45 and 70 wt % of the phosphate ion.

The catalyst disclosed herein assures a yield of dienes amounting on the average to 58–60 wt % of the feedstock, displays a selectivity of at least 90 wt % and has a mechanical strength of pellets between 150 and 190 kg/cm². A strength as high as that assures that the activity can be maintained unchanged for a considerable period, i.e. around 2 years.

The method for preparing a phosphatic catalyst according to the present invention includes producing phosphates of nickel and chromium with an atom-nickel-to-atom-chromium ratio of between 1:1 and 3:1 by the reduction of six-valent chromium compounds in the presence of phosphoric acid and nickel or a soluble nickel compound; adding to the phosphates of nickel and chromium thus obtained a calcium compound in an amount providing for an atom-calcium-to-atom-nickel ratio of between 6:1 and 12:1; precipitating the phosphates of calcium, nickel and chromium at a pH-value of the medium between 7 and 8.5; adding a compound containing, in terms of metal, either between 0.5 and 5 wt % of titanium or between 0.1 and 15 wt % of zirconium; and pelletizing the phosphates of calcium, nickel and chromium thus obtained which contain compounds of titanium and zirconium.

Phosphates of chromium and nickel can be obtained chemically by reducing aqueous solutions of six-valent chromium compounds in the presence of nickel compounds, using an organic reducing agent capable of burning up without residue.

The process of reduction is accomplished at a temperature between 70° and 90°C and is followed by boiling down the stock until its density is anywhere between 1.65 and 1.75 g/cm³. To avoid thickening of the stock during the reduction, it is preferred to carry out the process with a 50 to 100% surplus amount of phosphoric acid.

Among nickel compounds, suitable for the process are any soluble salts of nickel but preference must be given to those salts whose acid residues lend themselves to washing out readily as is the case with nitrates and chlorides for example.

As six-valent chromium compounds, use can be made of chromic acid or its ammonium salt. It is preferred to use chromic acid as strong as 600 to 950 g/l provided the atom-nickel-to-atom-chromium ratio is within the specified limits. The use of the ammonium salt of chromic acid entails protracted washing out of the ammonia ions.

Suitable for the reduction of six-valent chromium compounds are those organic reducing agents which burn up without leaving any impurities in the catalyst as is the case with ethyl alcohol and molasses. The latter, a product of incomplete hydrolysis of starch, appears to be cheaper and more convenient for use because it is an industrial waste.

The phosphates of nickel and chromium obtained chemically by the reduction of six-valent chromium are unstable and must be prepared directly before the preparation of the catalyst. The stability of phosphates can be increased by reducing aqueous solutions of six-valent chromium compounds electralytically in the presence of metallic nickel. The solution of acid phosphates of nickel and chromium obtained in this way displays a stability which remains without noticeable changes for a period of 1 year and even longer. For this reason preference is given to the electrolytic reduction rather than to the chemical one. The six-valent chromium compounds are the same as those used in conjunction with the chemical reduction.

Acidic phosphates of nickel and chromium are produced in a batch-type electrolytic cell with nickel electrodes. The electrolysis takes place at temperatures between 60° and 90°C in the presence of a strong mineral acid. The current density is between 0.03 and 0.1 A/cm$^2$. The temperature is maintained within said limits in order to obtain a solution of acidic phosphates of nickel and chromium with a density of 1.65 to 1.75 g/cm$^2$. At temperatures below 60°C, nickel dissolves too slowly with the result that the density of the solution is low. Temperatures above 90°C result in producing a viscous solution with a high density. When the electrolysis takes place as indicated above, the product is a solution of acidic phosphates with an atom-nickel-to-atom-chromium ratio of 1:1 to 3:1.

The strong mineral acid present in small amounts suppresses side reactions on the nickel electrodes. Suitable for this purpose are sulfuric, hydrochloric and nitric acids but preference is given to nitric and hydrochloric acids which pose no problems when washed out.

Added to the acidic phosphates of nickel and chromium thus obtained are calcium compounds. The amount added is controlled by the atom-calcium-to-atom nickel ratio which must be maintained between 6:1 and 12:1 in order to produce an active catalyst.

Suitable for use among calcium compounds are water-soluble salts of calcium such as chlorides, nitrates, acetates, oxalates and others. Preference is given to nitrates and chlorides because these materials are cheap and widely available. Salts of both pure and industrial grade can be used. When there are added to the solution of phosphates of chromium and nickel either calcium nitrate or calcium chloride, a precipitate of calcium phosphate may form which is dissolved by adding either nitric or hydrochloric acid in a small amount.

The precipitation of phosphates of calcium, nickel and chromium is brought about by adding an alkaline precipitant at temperatures between 10° and 30°C and a pH-value of the medium between 7 and 8.5.

Said parameters of the precipitation process are optimum values which provide for the settling of all components in the most complete way and obtaining a phosphate precipitate of requisite particle size.

The amount of settling can be controlled by changing the pH-value within the specified limits. High pH-values (8.5 to 10.0) cause some of the nickel to pass into solution in the form of soluble ammonia complexes so that the actual catalyst content will differ from the specified one. Low pH-values (under 7.5) bring about the formation of monosubstituted and disubstituted phosphates of calcium and nickel which can be transformed into trisubstituted salts only by keeping the precipitate under the mother liquor for a protracted period (the so called maturing of the precipitate); this, however, considerably impairs both the structure and mechanical properties of the precipitate. As a result, difficulty is experienced in washing the phosphate precipitate and the catalytic properties of the catalyst are also impaired. To avoid this, the pH-value of the medium must be kept between 7 and 8.5 during the process of precipitation.

The temperature maintained during the process of phosphate precipitation controls mainly the particle size of the precipitate. A temperature below the specified minimum brings about the formation of a coarse-grained precipitate with individual particles averaging between 6 and 8 microns. A temperature of 30°C and upwards creates conditions under which settling of a fine-grained precipitate with a particle size of 2 to 4 microns takes place. Such precipitates pose difficulties in washing away harmful impurities and lend themselves reluctantly to filtration. An optimum particle size of 4 to 5 microns and to obtain such particles the temperature should be kept within the range between 10° and 30°C. In this case, the aqueous suspension of precipitate readily stratifies, filters and lends itself to washing.

Another possible way of controlling the size of initial particles of the catalyst is to pass the solution through a magnetic field with a magnetizing force of between 6,000 and 12,000 oersted. This treatment changes the mobility of ions in the solution and, consequently, the rate of settling and particle size.

A precipitant suitable for the settling of the phosphates of calcium, nickel and chromium from the solution is an alkaline reagent, such as ammonia or any other alkali. Preference is given to aqueous ammonia which is added in amounts required for maintaining the pH-value of the medium between 7 and 8.5.

Added to the precipitate of phosphates of calcium, nickel and chromium are compounds containing such elements as titanium or zirconium. These are added as oxides, nitrates or chlorides in the form of an aqueous suspension of oxides or solutions of salts. A more convenient way is to mix the phosphates of calcium, nickel and chromium in the form of filtered and dried powder with a finely ground powder of titanium or zirconium compounds taken in amounts which contain between 0.5 and 5 wt % of titanium or between 0.1 and 15 wt % of zirconium.

The addition of elements from the subgroup of titanium to a phosphatic catalyst increases the activity and selectivity of the catalyst and also extends its service life, providing at the same time for an invariably high yield of diolefin in the course of a protracted period. It will be known that in a phosphatic catalyst the dehydrogenating component is nickel phosphate whereas chromium serves to stabilize the nickel phosphate. The stability of nickel phosphate is a factor of paramount importance as far as the effectiveness of an industrial catalyst is concerned and the stabilizing effect of nickel in a catalyst is enhanced by adding, as described hereinabove, compounds containing either titanium or zirconium.

The phosphate is powder form containing either titanium or zirconium is pelletized in a press, using a "lubricant" (graphite, sterotex, hexamethylenamine, etc) which not only facilitates the process of pelletizing but relieves the pellets of internal stresses. The strength of catalyst pellets thus obtained is commonly between 40 and 60 kg/cm$^2$.

The phosphatic catalyst produced in this way is a commercial product and can find application in dehydrogenating olefins and alkylated aromatic hydrocarbons.

Yet, to make the catalyst capable of withstanding protracted storage, the disclosed method for preparing phosphatic catalyst according to the invention entails thermal treatment of catalyst pellets by steam at temperatures between 600° and 800°C for a period lasting between 8 and 15 hours. After this treatment, the strength of the catalyst increases to between 150 and 190 kg/cm². The steaming can be accomplished directly in the reactor before the dehydrogenation.

Disclosed hereinafter is a preferred method of preparing the catalyst.

A batch-type electrolytic cell containing nickel electrodes is charged with an aqueous solution of chromium trioxide to which are added phosphoric, nitric and hydrochloric acids in amounts which assure that the electrolyte has a composition in g/l as follows: $CrO_3$, 80 to 90; $H_3PO_4$, 530 to 560; $HNO_3$, 1 to 15, HCl, 0.5 to 5. The electrolysis takes place at a current density of 0.03 to 0.1 A/cm² and a temperature between 75° and 80°C and is interrupted as soon as the atom-nickel-to-atom-chromium ratio is between 1.9:1 and 2.1:1 in the electrolyte. The solution of acidic phosphates of nickel and chromium obtained is drained into a tank charged with a solution of calcium nitrate or calcium chloride in an amount which provides for an atom-calcium-to-atom-nickel ratio between 8 and 9.5. The solution is acidified, using nitric or hydrochloric acid, so that its pH-value is not over 2 and then diluted with distilled water added in an amount assuring that the aggregate concentration of components in terms of oxides is not over 25 g/l. After vigorous stirring, the diluted solution of phosphates of calcium, nickel and chromium is continuously fed for precipitation by aqueous ammonia with a concentration of 4 or 5 g/l, the rate of flow being so adjusted that the pH-value of the mixture is between 7 and 8.5.

Preparatory to the precipitation by aqueous ammonia, the solution of phosphates of calcium, nickel and chromium is passed through a coil placed between the poles of an a.c. magnet capable of producing a magnetizing force between 6,000 and 12,000 oersted.

The phosphate suspension thus formed is washed to remove water-soluble salts, filtered and dried at a temperature between 160° and 200°C until the final moisture content of phosphates is 10 to 20 wt %. After drying, the phosphates are ground to obtain a particle size not exceeding 500 microns and mixed with finely ground zirconium oxide taken in an amount which provides for a content of metal in the catalyst between 0.1 and 15 wt %; alternatively, titanium oxide is added in an amount which provides for a metal content between 0.5 and 5.0 wt %.

After mixing of the phosphates of calcium, nickel and chromium with either zirconium oxide or titanium oxide, added to the mixture are 2 wt % of finely-ground graphite is added to the mixture. The final mixture is pelletized, the diameter of the pellets being 5 mm and the height 4 to 4.5 mm. After pelletizing, the catalyst is roasted in a stream of steam at 600° to 700°C for a period between 8 and 15 hours.

The present invention will be best understood from the following specific examples which serve to illustrate the invention.

EXAMPLE 1

A batch-type electrolytic cell with nickel electrodes was charged with 100 ml of phosphoric acid containing 1495 g $H_3PO_4$ per liter, 30 ml of dissolved chromium trioxide with a concentration of 770 g/l, 25 ml of 56-% nitric acid, 10 ml of 32-% hydrochloric acid and 108 ml of distilled water. The electrolysis was carried out at 75°C and a current density of 0.05 A/cm². The yield was 253 ml of acidic phosphates of nickel and chromium in a solution with a density of 1.65 g/cm³. The concentration of nickel ions in the solution was 135.5 g/l and the atom-nickel-to-atom chromium ratio was 1.9:1.

The solution of phosphates thus obtained was mixed with 25 l of an aqueous solution containing 1160 g of $Ca(NO_3)_2.4H_2O$ and 207 g of $H_3PO_4$. The atom-calcium-to-atom chromium ratio was 9:1.

The solution of acidic phosphates of nickel and chromium containg calcium nitrate was mixed with aqueous ammonia whose concentration was 4.5 g of $NH_3$ per liter. The solutions were mixed in amounts which provide for a pH-value of the mixture equal to 7.8. The settled suspension of phosphates was filtered, washed to remove water-soluble salts and dried at 180°C for 4 hours. On drying, the phosphates were ground to a particle size not over 500 microns, the powder was mixed with zirconium oxide taken in an amount corresponding to 15 wt % of the aggregate weight of dry catalyst powder, and then pelletized with a 2 wt % addition of graphite; the pellets were 5 mm in diameter and 4.5 mm high.

The composition of the catalyst thus obtained was, in terms of absolutely dry ingredients, as follows (in wt. %): Ni;4.6; Cr, 2.6; Zr, 11.2; Ca, 27.2; $PO_4$, 52.4; graphite, 2.0.

The catalyst pellets were roasted in a stream of steam delivered at a rate of 2000 volumes per volume of catalyst at a temperature between 650° and 700°C for a period of 10 hours.

The activity of the catalyst was determined under isothermal conditions by dehydrogenating butylenes fed at an hourly rate of 600 liters per kg of catalyst in 15-minute cycles at 650°C, but butylene feed being diluted with steam in an amount of 20 moles per mole of the hydrocarbon. The total duration of the dehydrogenation process was 48 hours. For the regeneration of the catalyst use was made of a mixture of air and steam, the air being fed at an hourly rate of 750 liters per kg of catalyst. The results of catalyst tests are given in Table 1.

The strength of the catalyst was averaged from 20 crushing tests of pellets.

EXAMPLE 2

The catalyst was prepared as outlined in Example 1 except that zirconium oxide in an amount corresponding to 5 wt % of the aggregate weight of dry catalyst powder was added to the phosphate powder. The composition of the catalyst thus obtained was, in terms of absolutely dry ingredients, as follows (in wt %): Ni, 4.60; Cr, 2.7; Zr, 3.9; Ca, 30.0; $PO_4$, 56.8; graphite, 2.0. The activity of the catalyst was determined in the same way as outlined in Example 1. The results of catalyst tests are given in Table 1.

EXAMPLE 3

The catalyst was prepared as outlined in Example 1 except that zirconium oxide in an amount equal to 0.13 wt % was added to the phosphate powder. The composition of the catalyst in wt % was as follows: Ni, 4.91; Cr, 3.0; Zr, 0.1; Ca, 31.78, $PO_4$, 58.7; graphite 1.5. The results of catalyst tests are given in Table 1.

Table 1

| Catalyst | Butadiene yield, wt % in terms of butylene feed-stock | Butadiene yield, wt % in terms of decomposed butylene | Strength after dehydro-genation, kg/cm² |
|---|---|---|---|
| From Example 1 | 50.4 | 91.2 | 160 |
| From Example 2 | 59.3 | 90.9 | 190 |
| From Example 3 | 56.5 | 91.5 | 180 |

EXAMPLE 4

The catalyst was prepared as outlined in Example 1 except that titanium dioxide was mixed with the phosphate powder in a proportion which provided for a catalyst of the following composition, wt %: Ni; 4.9; Cr, 2.95; Ti, 0.5; Ca, 31.5; $PO_4$, 58.7; graphite, 1.5.

The activity of the catalyst during the reaction of butylene dehydrogenation and the mechanical strength were determined as outlined in Example 1. The test results are given in Table 2.

EXAMPLE 5

The catalyst was prepared as outlined in Example 1 and had the following composition, wt %: Ni, 4.8; Cr, 2.9; Ti, 1.5; Ca, 31.2; $PO_4$, 58.1; graphite 1.5.

The activity of the catalyst during the reaction of butylene dehydrogenation and the mechanical strength were determined as outlined in Example 1. The test results are given in Table 2.

EXAMPLE 6

The catalyst was prepared as outlined in Example 1 and its composition was as follows, wt %; Ni, 4.6; Cr. 2.7; Ti, 3.5; Ca, 30.2; $PO_4$, 57.0; graphite, 2.0.

The activity of catalyst during the reaction of butylene dehydrogenation and the mechanical strength were determined as outlined in Example 1. The test results are given in Table 2.

Table 2

| Catalyst | Butadiene yield, wt % in terms of butylene feed-stock | Butadiene yield, wt % in terms of decomposed butylene | Strength after dehydro-genation, kg/cm² |
|---|---|---|---|
| From Example 4 | 52.4 | 91.6 | 150 |
| From Example 5 | 55.8 | 90.4 | 160 |
| From Example 6 | 52.6 | 91 | 170 |

EXAMPLE 7

The catalysts was prepared as outlined in Examples 2 and 5 were subject to test during the process of ethyl benzene dehydrogenation at 600°C and an hourly rate of feed-stock delivery of 0.5 liter per kg of catalyst, provided the feedstock-to-steam weight ratio was 1:3. The test results are given in Table 3.

Table 3

| Catalyst | Styrene yield, wt % in terms of ethyl benzene feedstock | Styrene yield, wt % in terms of decomposed ethyl benzene |
|---|---|---|
| From Example 2 | 60.7 | 94.3 |
| From Example 5 | 59.3 | 94.1 |

EXAMPLE 8

A jacketed reaction vessel was charged with 24.5 ml of water-diluted chromic acid (concentration 980 g/l), 250 ml of nickel nitrate containing 160 g $Ni_2O_3$ per liter and 250 ml of phosphoric acid with a $H_3PO_4$ content of 1490 g/l taken in an amount exceeding the stoichiometric requirement by 100 %. Added gradually to the solution thus obtained was molasses taken in an amount by far exceeding that which is required to reduce the available amount of six-valent chromium. The process of reduction was regarded as completed when the gaseous products of the reaction ceased to be liberated. After that the stock in the vessel was boiled off to obtain a density of 1.65 g/cm³.

The solution of acidic phosphates of nickel and chromium thus obtained was mixed with 25 ml of an aqueous solution containing 1160 g of $Ca(NO_3)_2 \cdot 4H_2O$ and then to this mixture aqueous ammonia was added as the precipitant with a concentration of 3.5 to 4 g/l. The solutions were used in amounts providing for a pH-value of 7.5 to 8.

Further the phosphate precipitate was handled as in Example 1 except that zirconium in an amount of 5 wt % was added. The composition of the catalyst was the same as in Example 2.

EXAMPLE 9

The catalyst was prepared in the same way as outlined in Example 8 except that ethyl alcohol was used to reduce the six-valent chromium The results of test of the catalysts prepared as indicated in Examples 8 and 9 are given in Table 4.

Table 4

| Catalyst | Butadiene yield, wt % in terms of butylene feedstock | Butadiene yield, wt % in terms of decomposed butylenes |
|---|---|---|
| From Example 8 | 58.6 | 90.4 |
| From Example 9 | 58.4 | 90.6 |

EXAMPLE 10

The catalyst was prepared in accordance with the procedure outlined in Example 1 except that the solution of phosphates containing calcium, nickel and chromium was, preparatory to the precipitation, treated magnetically using a magnetic field with a magnetizing force of 6,000 oersted. The results of the catalyst test are given in Table 5 which contains for comparison also data on the results of the test of the catalyst prepared in accordance with the procedure adopted in Example 2.

Table 5

| Catalyst | Butadiene yield, wt % in terms of butylene feedstock | Butadiene yield, wt % in terms of decomposed butylene |
|---|---|---|
| From Example 10 | 59.0 | 91.5 |
| From Example 2 | 59.3 | 90.9 |

EXAMPLE 11

The catalyst was prepared along the same lines as indicated in Example 1 except that zirconium oxide in an amount of 5 wt % was added at the stage when the precipitation of phosphates of calcium, nickel and chromium took plate. An aqueous suspension of zirconium oxide containing the oxide in an amount of 30 g per 10 l of water was added to 75 l of the aqueous suspension of precipitated phosphates.

When tested, the catalyst thus obtained provided for a butadiene yield of 60.2 wt % in terms of feedstock and showed a selectivity of 90.2 wt %. The strength after dehydrogenation was 190 kg/cm$^2$.

What is claimed is:

1. A phosphatic catalyst for the dehydrogenation of olefins and alkylaromatic hydrocarbons consisting essentially of calcium, nickel and chromium phosphates and the oxide of an element selected from the group consisting of titanium and zirconium, the elemental composition of the catalyst in percent by weight being as follows: calcium, 20–40; nickel, 3–6; chromium, 0.5–5; titanium, 0.5–5 or zirconium, 0.1–15; and phosphorus, 15–23.

2. A method of preparing the phosphatic catalyst of claim 1 which consists essentially of (a) reducing a soluble hexavalent chromium compound in aqueous solution in the presence of phosphoric acid and a nickel compound introduced into the solution in such quantity as to produce a solution containing nickel and chromium phosphates having a nickel-to-chromium atomic ratio of 1–3:1, (b) introducing into said solution of nickel and chromium phosphates an aqueous solution of a water-soluble calcium salt until the calcium-to-nickel atomic ratio is 6–12:1 whereby a calcium-, chromium-, and nickel-containing solution is produced, (c) precipitating calcium, nickel and chromium phosphates from said calcium-, chromium- and nickel-containing solution with an alkaline agent at a pH of the reaction mixture of 7–8.5, and (d) thereafter adding to the precipitated phosphates the oxide of an element selected from the group consisting of titanium and zirconium, pelletizing the catalyst mass thus obtained and subjecting the resulting catalyst pellets to steam at a temperature between 600° and 800°C. for 8–15 hours.

3. A method as claimed in claim 2, wherein said solution containing nickel and chromium phosphates is obtained by the electrolytic reduction of an aqueous solution of six-valent chromium compounds at a temperature between 60° and 90°C, a current density of 0.03 to 0.1 A/cm$^2$ in the presence of a strong mineral acid using nickel electrodes, said strong mineral acid being taken in an amount between 0.1 and 2.0 wt %.

4. A method as claimed in claim 2, wherein said solution containing nickel and chromium phosphates is obtained by the chemical reduction of aqueous solutions of six-valent chromium compounds in the presence of nickel compounds, using an organic reducing agent capable of burning up without residue.

5. A method as claimed in claim 2, wherein the water-soluble nickel salt is selected from the group consisting of nickel nitrate and nickel chloride.

6. A method as claimed in claim 2, wherein the soluble hexavalent chromium compound is selected from the group consisting of chromic acid and ammonium chromate.

7. A method as claimed in claim 4, in which ethyl alcohol is used as the organic reducing agent.

8. A method as claimed in claim 4, in which a product of incomplete hydrolysis of starch is used as the organic reducing agent.

9. A method as claimed in claim 2, wherein the water-soluble calcium salt is selected from the group consisting of calcium chloride and calcium nitrate.

10. A method as claimed in claim 2, in which prior to the precipitation of said phosphates, said solution of calcium, nickel and chromium compounds is subjected to a magnetizing force between 6,000 and 12,000 oersted.

11. A method as claimed in claim 2, wherein the oxide of an element selected from the group consisting of titanium and zirconium is added directly to the reaction mixture containing precipitated calcium, nickel and chromium phosphates.

12. A method as claimed in claim 2, wherein the oxide of an element selected from the group consisting of titanium and zirconium is added to the calcium, nickel and chromium phosphates after said phosphates have been separated from the reaction mixture and dried.

* * * * *